(12) United States Patent
Phinney

(10) Patent No.: US 6,692,716 B1
(45) Date of Patent: Feb. 17, 2004

(54) METHOD OF FORMULATING ALKALI EARTH SALTS

(75) Inventor: Robin Phinney, Calgary (CA)

(73) Assignee: Airborne Industrial Minerals, Inc., Calgary (CA)

(*) Notice: Subject to any disclaimer, the term of this patent is extended or adjusted under 35 U.S.C. 154(b) by 0 days.

(21) Appl. No.: 09/292,011

(22) Filed: Apr. 15, 1999

Related U.S. Application Data (60) Provisional application No. 60/103,969, filed on Oct. 13, 1998.

(51) Int. Cl.⁷ .............. C01D 7/00; C01D 5/00; C01D 5/02
(52) U.S. Cl. ............... 423/422; 423/428; 423/544; 423/548; 423/551; 23/302 T
(58) Field of Search .................. 423/422, 548, 423/544, 551, 428; 424/715, 717; 23/302 T (56) References Cited

U.S. PATENT DOCUMENTS

| | | | |
|---|---|---|---|
| 1,979,151 A | 10/1934 | Fricke et al. | 23/63 |
| 3,206,297 A | 9/1965 | Buell O'connor | 71/28 |
| 3,423,171 A | 1/1969 | Hoppe et al. | 23/121 |
| 3,429,657 A | 2/1969 | George et al. | 23/63 |
| 3,493,329 A | 2/1970 | Stiers | 23/63 |
| 3,528,767 A | 9/1970 | Garrett | 23/89 |
| 3,553,100 A | 1/1971 | Jorda et al. | 208/11 |
| 3,578,399 A | 5/1971 | Boeglin | 23/121 |
| 3,656,891 A | 4/1972 | Chemtob | 23/59 |
| 3,687,639 A | 8/1972 | Barlow et al. | 23/300 |
| 3,711,254 A | 1/1973 | McGowan et al. | 23/313 |
| 3,728,438 A | 4/1973 | Nasyrov | 423/551 |
| 3,843,772 A | 10/1974 | Boeglin | 423/551 |
| 3,853,490 A | 12/1974 | Boeglin et al. | 23/313 |
| 3,967,930 A | 7/1976 | Sadan | 23/296 |
| 3,983,211 A | 9/1976 | Nasyrov et al. | 423/128 |
| 3,984,521 A | 10/1976 | Nasyrov et al. | 423/120 |
| 3,998,935 A | 12/1976 | Adams et al. | 423/552 |
| 4,033,842 A | 7/1977 | Loest et al. | 204/180 |
| 4,045,543 A | 8/1977 | Sardisco | 423/482 |
| 4,129,642 A | 12/1978 | Neitzel | 423/199 |
| 4,164,543 A * | 8/1979 | Dezael et al. | 423/189 |
| 4,174,382 A | 11/1979 | Menche | 423/552 |
| 4,215,100 A | 7/1980 | Sokolov et al. | 423/552 |
| 4,268,492 A | 5/1981 | Sardisco et al. | 423/482 |
| 4,303,619 A | 12/1981 | Kobayashi et al. | 422/205 |
| 4,342,737 A | 8/1982 | Iwashita et al. | 423/522 |
| 4,371,512 A | 2/1983 | Sardisco et al. | 423/551 |

(List continued on next page.)

FOREIGN PATENT DOCUMENTS

| | | | |
|---|---|---|---|
| CA | 821457 | 8/1969 | 23/94 |
| CA | 2032627 | 12/1990 | 23/19 |

OTHER PUBLICATIONS

Mullin, J. W., Crystallization, London, Butterworths 1961, p. 85–95.

A.P. Belopol'sky, An Ammonia–Soda Process Based Mirabilite, Scientific Institute for Fertilizers, Insecticides and Fungicides delivered at the International Congress on Industrial Chemistry in Brussels (Sep. 24, 1935).

Primary Examiner—Steven P. Griffin
Assistant Examiner—Eileen E. Nave
(74) Attorney, Agent, or Firm—Paul S. Sharpe; Ogilvy Renault (57) ABSTRACT

Methodology for formulating sodium bicarbonate and potassium sulfate. In one embodiment, sodium sulfate and ammonium bicarbonate are reacted to form sodium bicarbonate with the remaining liquor or brine treated with sulfuric acid to remove carbonates with subsequent precipitation of potassium sulfate. A further embodiment employs ammonium bicarbonate, ammonia gas or carbon dioxide to precipitate sodium bicarbonate. The result of the methods is the production of high quality fertilizer and food grade sodium bicarbonate.

16 Claims, 6 Drawing Sheets

U.S. PATENT DOCUMENTS

| | | | |
|---|---|---|---|
| 4,385,920 A | 5/1983 | Dancy et al. .................. 71/36 |
| 4,420,468 A | 12/1983 | Yamashita et al. .......... 423/482 |
| 4,436,710 A | 3/1984 | Miyazaki et al. ............ 423/552 |
| 4,533,536 A | 8/1985 | Bichara et al. ............. 423/551 |
| 4,554,151 A | 11/1985 | Worthington et al. ....... 423/551 |
| 4,562,058 A | 12/1985 | Dancy et al. ............... 423/551 |
| 4,588,573 A | 5/1986 | Worthington et al. ....... 423/552 |
| 4,668,242 A | 5/1987 | Vitellaro et al. .............. 23/313 |
| 4,707,347 A | 11/1987 | Vajna et al. ................. 423/552 |
| 4,844,874 A | 7/1989 | de Vries .................... 423/210 |
| 5,135,734 A | 8/1992 | Ninane ....................... 423/659 |
| 5,230,779 A | 7/1993 | Martin ........................ 204/98 |
| 5,246,551 A | 9/1993 | Pletcher et al. ................ 204/96 |
| 5,275,794 A | * 1/1994 | Luna ........................... 423/190 |
| 5,286,354 A | 2/1994 | Bard et al .................... 204/86 |
| 5,290,404 A | 3/1994 | Toomey ........................ 204/72 |
| 5,298,050 A | 3/1994 | McGlaughlin et al. ......... 71/63 |
| 5,366,534 A | 11/1994 | Fischbein et al. ............... 71/63 |
| 5,445,717 A | 8/1995 | Kärki et al. |
| 5,529,764 A | 6/1996 | Lampert et al. ............ 423/552 |
| 5,549,876 A | 8/1996 | Zisner et al. ................ 423/199 |
| 5,552,126 A | 9/1996 | Efraim et al. ............... 423/199 |
| 5,624,649 A | * 4/1997 | Gal ........................ 423/423.11 |
| 5,654,351 A | 8/1997 | Kresnyak et al. ........... 423/423 |

* cited by examiner

METHOD OF FORMULATING ALKALI EARTH SALTS

This application claims the benefit of U.S. Provisional Application No. 60/103,969, filed Oct. 13, 1998.

FIELD OF THE INVENTION

The present invention relates to a method of formulating alkali earth salts and more particularly, the present invention relates to a method of gene rating food grade sodium bicarbonate and fertilizer grade potassium sulfate.

BACKGROUND OF THE INVENTION

A significant amount of prior art has been promulgated with respect to the formulation of alkali earth salts. Sodium bicarbonate, as an example, has been prepared in as many different ways as it has been known. Despite this fact, previous unit operations for bicarbonate synthesis have been hampered by inefficient energy use which results directly in increased synthesis costs. As a further limitation, known processes do not make efficient use of the unit operations involved in the preparation of salts. Typically, a single high quality product is formulated with concomitant byproduct formation of a quality inadequate for commercial purposes or that would require too substantial an investment to render them commercially viable.

Representative of the prior art is U.S. Pat. No. 3,429,657, issued Feb. 25, 1969, to D'Arcy. The reference discusses a method for recovering and producing potassium salts. In the reference, a potassium bearing brine is reacted with sodium perchlorate to precipitate potassium perchlorate. The potassium is removed by ion exchange with sodium and the free potassium is then combined with chloride, sulfate, nitrate inter alia.

SUMMARY OF THE INVENTION

One object of the present invention is to provide a method of formulating food grade sodium bicarbonate and potassium sulfate, comprising the steps of:
  a) providing a source of liquid sodium sulfate;
  b) providing a source of ammonium bicarbonate;
  c) contacting the sodium sulfate and the ammonium bicarbonate;
  d) precipitating sodium bicarbonate and forming a liquor;
  e) precipitating sodium bicarbonate and forming a liquor by contacting the liquor from step d) with sodium sulfate;
  f) saturating the liquor from step e) with sodium sulfate;
  g) filtering solids from the liquor of step f);
  h) contacting the liquor from step g) with sulfuric acid to precipitate carbonates;
  i) cooling the liquor from step h) to 0° C. to form Glauber's salt precipitate;
  j) heating the liquor from step i) to between 30° to 40° C.; and
  k) precipitating potassium sulfate by contacting the liquor from step j) with potassium chloride.

A further object of the present invention is to provide a method of formulating food grade sodium bicarbonate and potassium sulfate, comprising the steps of:
  a) providing a source of liquid sodium sulfate;
  b) providing a source of ammonium bicarbonate;
  c) contacting the sodium sulfate and the ammonium bicarbonate;
  d) precipitating sodium bicarbonate and forming a liquor;
  e) precipitating sodium bicarbonate and forming a liquor by contacting the liquor from step e) with sodium sulfate;
  f) saturating the liquor from step e) with anhydrous sodium sulfate;
  g) filtering solids from the liquor of step f);
  h) contacting the liquor from step g) with at least one of ammonium bicarbonate, ammonia gas or carbon dioxide to precipitate sodium bicarbonate;
  i) cooling the liquor from step h) to 0° C. to a precipitate of sodium bicarbonate and sodium sulfate; and
  j) precipitating potassium sulfate by contacting the liquor from step i) with potassium chloride.

It has been found that following the sodium bicarbonate formulation, significant success in cooling the liquor to 0° C. is realized for removing sodium sulfate as Glauber's salt and sodium bicarbonate. Glauber's salt solubility in the system is contemplated by the ammonium sulfate-sodium sulfate phase diagram. By increasing the sodium sulfate in the bicarbonate circuit with increased Glauber's salt recycle, there is a tendency to decrease the bicarbonate solubility and increase the process efficiency.

Regarding the conversion of the starting reagents to potassium sulfate, particular success has been encountered by maintaining a mole ratio of five (5) or greater for the potassium and ammonium ions. This ratio ensures high conversion efficiency in the second stage of the process.

Having thus described the invention, reference will now be made to the accompanying drawings illustrating preferred embodiments.

BRIEF DESCRIPTION OF THE DRAWINGS

Similar numerals in the figures denote similar elements.

DETAILED DESCRIPTION OF THE PREFERRED EMBODIMENTS

Figure 1:
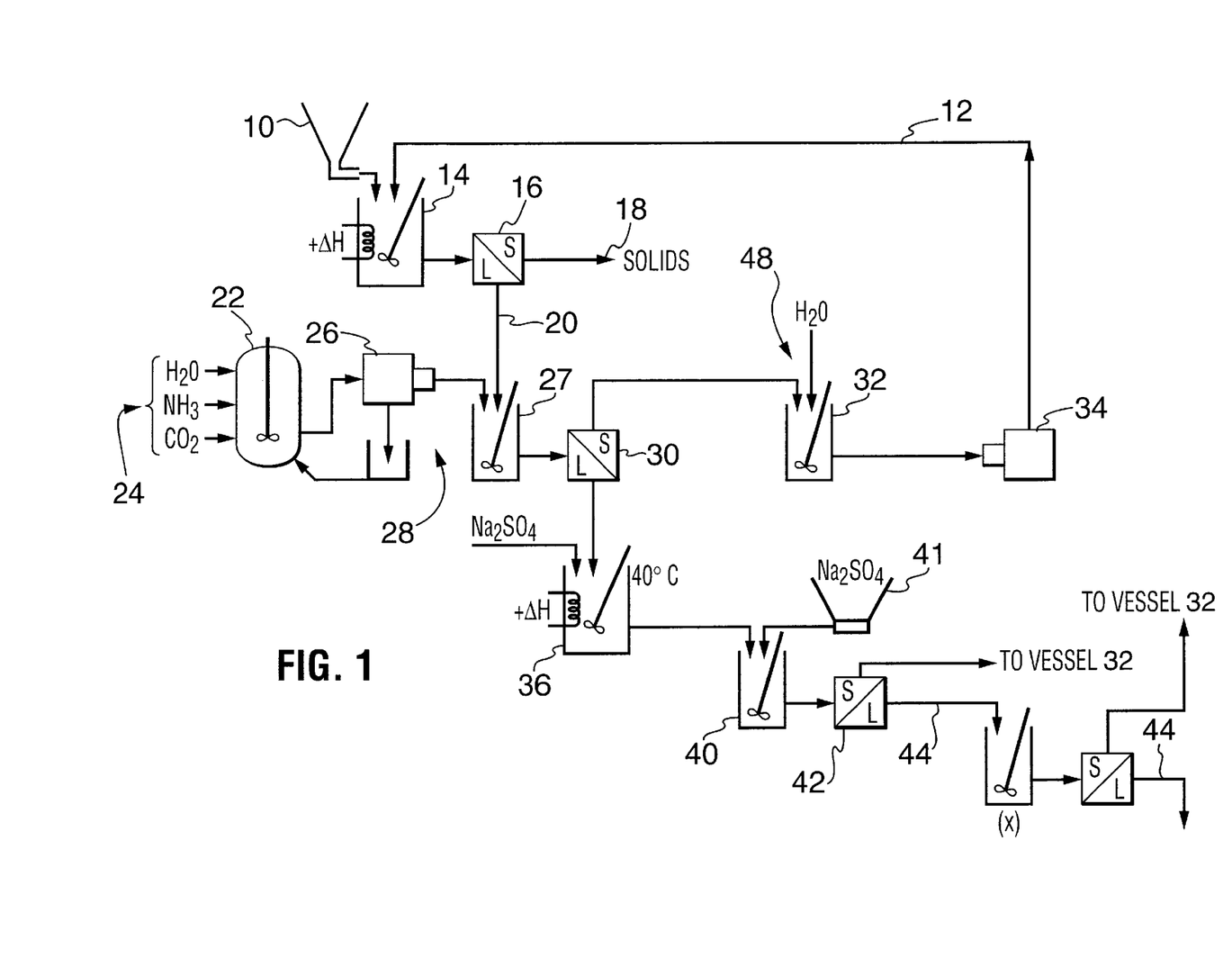
FIG. 1 is a process flow diagram illustrating a first part of one process according to the present invention.
Figure 1A:
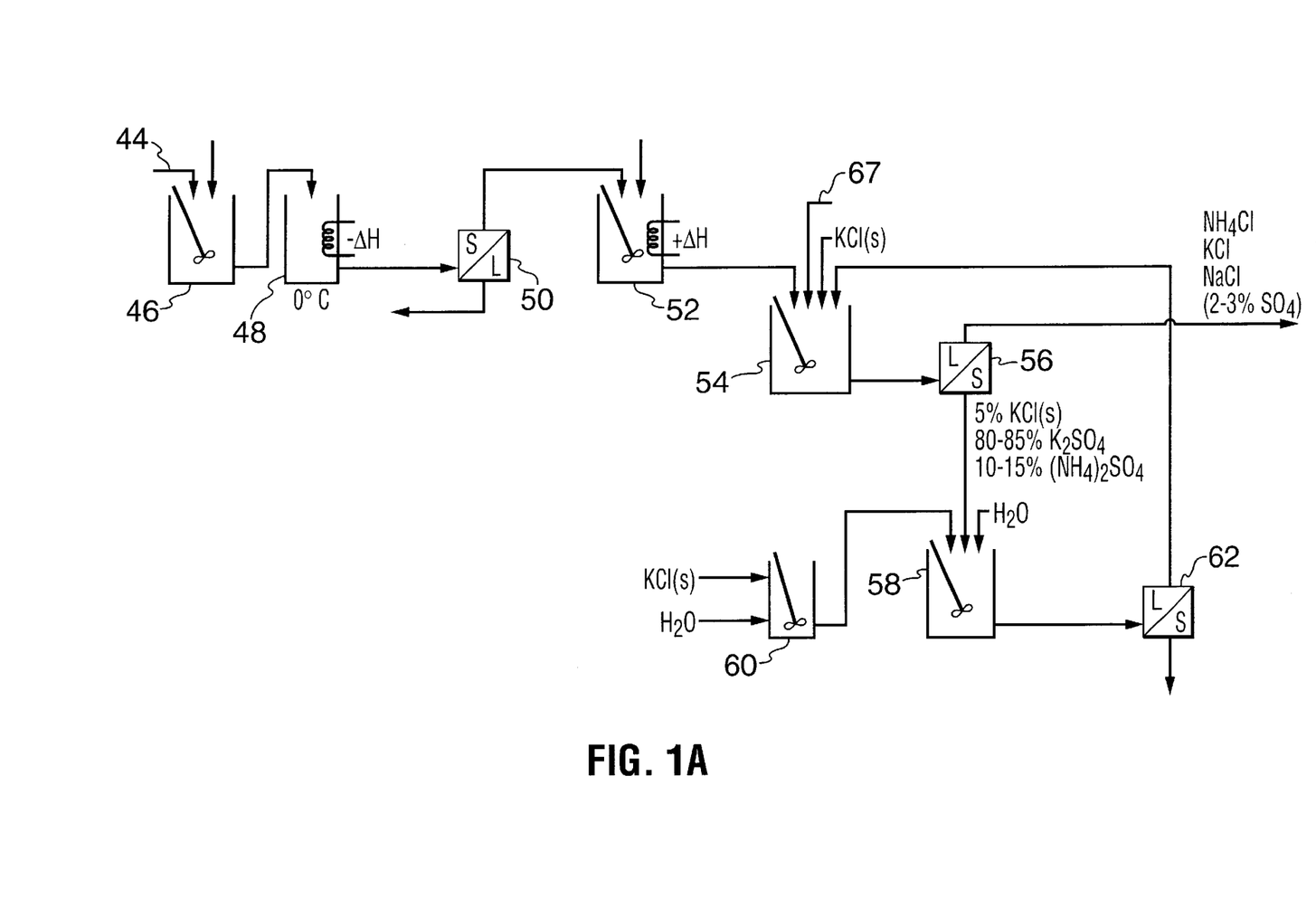
FIG. 1a illustrates a second part of the process illustrated in FIG. 1.
Figure 1B:
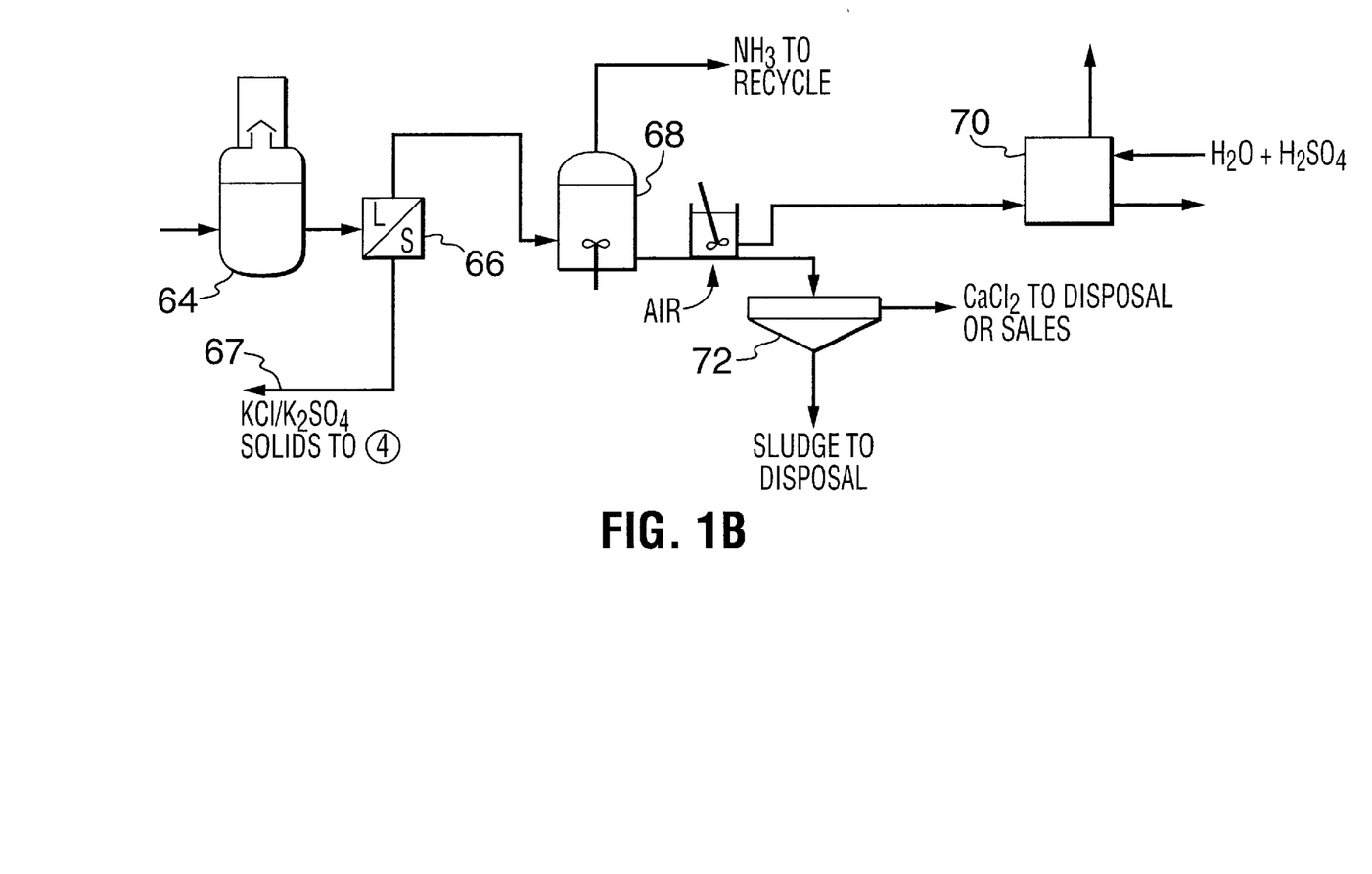
FIG. 1b illustrates a third part of the process illustrated in FIG. 1.

Referring now to the drawings, FIGS. 1 through 1b illustrate the process according to a first embodiment.

A source of liquid sodium sulfate 10 dissolved in fresh water and centrate water 12 discussed herein after. The solution is mixed in vessel 14 at 40° C. to a specific gravity of 1.30. The solution is filtered in filter 16 which, as an example, may comprise a 5 micron filter. The solids 18 are disposed of while the filtrate 20 is passed into a first sodium bicarbonate crystallization vessel 27.

Feeds of water, ammonia and carbon dioxide all denoted by numeral 24 are reacted in vessel 22 in order to synthesize ammonium bicarbonate. Formulated ammonium bicarbonate is centrifuged in centrifuge 26, with the solid product being passed into crystallization vessel 27. A recycle loop 28 recirculates ammonium bicarbonate solids and liquor into reaction vessel 29. The result of the combination in vessel 29 is the formulation of sodium bicarbonate. The mixture is filtered by filter 30 and centrifuged. The sodium bicarbonate is washed with water in vessel 32, centrifuged in centrifuge 34 and the solid retained as food grade sodium bicarbonate. The wash water is returned to vessel 14.

The liquor from filter 30 has a specific gravity of 1.25 with the contents including approximately 10.4% sodium sulfate, 17.1% ammonium sulfate, 8% sodium bicarbonate and excess ammonium bicarbonate for reaction with the Glauber's salt (discussed herein after). The liquor is reacted in a vessel 36 at 40° C. with Glauber's salt formulated in the cooling phase of the process, which will be discussed later, to produce sodium bicarbonate from the excess of ammonium bicarbonate from crystallization vessel 29. Alternatively, the ammonium bicarbonate may be added to the second stage (vessel 36) as solid, slurry or solution.

To the liquor from vessel 36 is added to solid sodium sulfate from source 41 in vessel 40 to formulate a saturated liquor of sodium sulfate/ammonium sulfate. Sufficient ammonium bicarbonate may be present to complete the reaction is solution or some may be added to result in the liquor having a specific gravity of 1.285. The slurry from vessel 40 is filtered with filter 42. The sodium bicarbonate solids 48 are passed to vessel 32 and the liquor 44 is further processed with additional separation of sodium bicarbonate, which is returned to vessel 32. The liquor 44, is then passed to vessel 46 (FIG. 1A). Circuit volume from the sodium bicarbonate circuit can be controlled by evaporating the purified sodium sulfate in the feed to produce solid sodium sulfate to ensure circuit saturation.

Returning to FIG. 1A, vessel 46 contains sulfuric acid to precipitate carbonate compounds. The so treated liquor is cooled to 0° C. in chiller 48 to recover Glauber's salt and filtered in filter 50. The recovered Glauber's salt is returned to the sodium bicarbonate crystallization vessel 36.

The filtrate contains 25.25% by weight ammonium sulfate and up to 1% by weight sodium sulfate and is passed into a vessel 52 heated to between 30° C. and 40° C. and combined with solids 65 from filter 66. This solution is passed into vessel 54 where solid potassium chloride is reacted therewith to formulate a 20% by weight solution of ammonium chloride also containing, by weight approximately, 20.2% ammonium chloride, 6.7% potassium chloride, 4.9% sodium chloride, 2.3% as $(x)_2SO_4$, where x=Na, K, and solid mixed crystals of potassium sulfate with 10%–20% ammonium sulfate.

The solution is filtered in filter 56, with the solid fraction containing approximately by weight, 5% potassium chloride, 80%–85% potassium sulfate, 10%–15% ammonium sulfate. The solid fraction is combined in vessel 58 with water and potassium chloride brine from vessel 60. The potassium sulfate solid is centrifuged and filtered in filter 62 and recrystallized with a solution of potassium chloride at 25° C. The remaining ammonium sulfate is converted to potassium sulfate. Grades of greater than 98% potassium sulfate are achievable.

In further unit operations, the liquor or filtrate from the potassium sulfate operations and specifically from filter 56 is processed in accordance with the unit operations set forth in FIG. 1c. The liquor is evaporated in evaporator in order to concentrate the ammonium chloride liquor such that upon cooling the potassium chloride and residual sulphates are minimized in solution. The solution is filtered with filter 66 with the solid material 67 recycled to vessel 54. The filtrate containing approximately 22% to 30% ammonium chloride is reacted with lime in reactor 68 with liberated ammonia recycled. The calcium chloride formed may be passed to a settler 70 or scrubber 72 depending on intended subsequent uses.

Having set forth the process according to this first embodiment, reference will now be made to an example of the process.

EXAMPLE 1

BICARBONATE KILL PRIOR TO POTASSIUM SULFATE PROCESS

Feed—1 liter @ 1.3 S.G. 360 g/l $Na_2SO_4$

1st STAGE

Production of $NaHCO_3$

Brine Exit at reaction termination:

| | | |
|---|---|---|
| 130 g $Na_2SO_4$ | 10.4% $Na_2SO_4$ | 40° C. |
| 213.8 g $(NH_4)_2SO_4$ | 17.1% $(NH_4)_2SO_4$ | 1.250 S.G. @ 0.95 l |
| 100 g $NaHCO_3$ | 8.0% $NaHCO_3$ | solution |
| 907 g $H_2O$ | | |
| 1350.8 | | |
| This makes 172 g $NaHCO_3$ solids | | SECOND STAGE ESTIMATE |
| consumes | 55 g $NH_3$ | A) 25.07 g $NH_3$ + 64.9 g $CO_2$ |
| | 142.5 g $CO_2$ | B) 51.2 g $NH_3$ + 132.6 g $CO_2$ |

2nd STAGE 0.95 l of brine will dissolve the following:

| | |
|---|---|
| A) 1 Moles $Na_2SO_4 10H_2O$ (332 g) | |
| 272 g $Na_2SO_4$ | 16.2% $Na_2SO_4$ |
| 213.8 g $(NH_4)_2SO_4$ | 12.8% $(NH_4)_2SO_4$ |
| 100 g $NaHCO_3$ | 5.9% $NaHCO_3$ |
| 1087 g $H_2O$ | 65.1% $H_2O$ |
| 1672.8 | |
| 1.275 S.G. and | 1.313 l brine |
| B) 2 Moles $Na_2SO_4 10H_2O$ (644 g) | |
| 414 g $Na_2SO_4$ | 20.7% $Na_2SO_4$ |
| 213.9 g $(NH_4)_2SO_4$ | 10.7% $(NH_4)_2SO_4$ |
| 100 g $NaHCO_3$ | 5.0% $NaHCO_3$ |
| 1267 g $H_2O$ | 63.4% $H_2O$ |
| 1999 | |
| 1.300 S.G. and | 1.5 l brine |

2nd STAGE Final Solution Composition

| | |
|---|---|
| A) | |
| 167.3 g $Na_2SO_4$ | 10% $Na_2SO_4$ |
| 311 g $(NH_4)_2SO_4$ | 18.9% $(NH_4)_2SO_4$ |
| 131 g $NaHCO_3$ | 8% $NaHCO_3$ |
| 1087 g $H_2O$ | 63.1% $H_2O$ |
| 1644.5 g Solution | |
| Production of $NaHCO_3$ 92.9 g | |
| S.G. 1.265 and makes 1.31 l brine | |
| B) | |
| 200 g $Na_2SO_4$ | 10% $Na_2SO_4$ |
| 412 g $(NH_4)_2SO_4$ | 20.2% $(NH_4)_2SO_4$ |
| 160 g $NaHCO_3$ | 8% $NaHCO_3$ |
| 1267 g $H_2O$ | 61.8% $H_2O$ |
| 2039 g Solution | |
| Production of 193.2 g $NaHCO_3$ | |
| S.G. 1.285 and makes 1.6 l of Solution | |

-continued

BICARB KILL 412 g $(NH_4)_2SO_4$
200 g $NaSO_4$
160 g $NaHCO_3$     +    $\frac{160}{84(2)} \times 98 = 93.3$ g $H_2SO_4$
1267 g $H_2O$ 2039 g (1.61)
      1.285 S.G.
This becomes:
412 g $(NH_4)_2SO_4$
335 g $NaSO_4$
1267 g $H_2O$ 2014 g @ 1.265 = (1.61)
must add $Na_2SO_4$ to Saturation of 1.30 S.G.
1.61 × 1.30 = 2080
Therefore:
412 g $(NH_4)_2SO_4$
400 g $NaSO_4$
1267 g $H_2O$ 2079 g total (1.61)
Cooling 412 g $(NH_4)_2SO_4$    28.7%
116 g $NaSO_4$          8.0%
907 g $H_2O$            63%

1435 g Solution
Feed to Evaporator

| | | |
|---|---|---|
| NH4Cl | 330.8 g | 21.9 |
| KCl | 130 g | 8.6% |
| NaCl | 94.7 g | 6.3% |
| x-SO4 | 50 | 3.3% |
| H2O | 907 g | 60.0 |
| | 1512 g | |

@ 33% $NH_4Cl$     then: −2.8% KCl
                   then: −2.0% $K_2SO_4$

Therefore: $\frac{330.8}{.33} = 1002$ g

Evaporation Load = 907 − 623 = 284 g
0.79 t/t $Na_2SO_4$
add 0.5 t for washing
1.29 t $H_2O$/t $Na_2SO_4$
$K_2SO_4$ Reaction a) $K_2SO_4$ from $(NH_4)_2SO_4 = \frac{412}{132} \times 174 = 543$ g b) $K_2SO_4$ from $Na_2SO_4 = \frac{116}{142} \times 174 = 142$ g c) Losses of $K_2SO_4$ = −43 g TOTAL $K_2SO_4$     642 g KCl Recovery a) KCl intermig reaction = $\frac{685}{174} \times 2 \times 74 = 582$ g b) KCl lost to tails = 50 g
c) Therefore : KCl need = 632 g $K_2SO_4$ yield = $\frac{642}{685} \times 100 = 93.7\%$ KCl Conversion Efficiency = $\frac{582}{632} \times 100 = 92.1\%$ BASIS: One Tonne of $Na_2SO_4$ Feed

| Inputs | Product |
|---|---|
| First Stage | |
| 0.153 t $NH_3$ | 0.48 t $NaHCO_3$ |
| 0.396 t $CO_3$ | |
| 2.52 t $H_2O$ | |
| Second Stage | |
| 644 g $Na_2SO_4 10H_2O$ | 0.53 t $NaHCO_3$ |
| 0.142 t $NH_3$ | |
| 0.368 t $CO_2$ | |
| Bicarb Kill + $Na_2SO_4$ Saturation | Filter to Produce clear brine |
| 0.26 t $H_2SO_4$ | |
| 0.18 t $Na_2SO_4$ | |
| Cooler to 0° C.   -BTU's | 1.8 t $Na_2SO_4 10H_2O$ |
| Cooler brine | 1.14 t $(NH_4)_2SO_4$    28.7% |
| | 0.32 t $Na_2SO_4$        8.0% |
| | 2.52 gt $H_2O$           63% |
| | 3.99 t Total |
| | 1.78 t $K_2SO_4$ |
| KC1 = 1.76 t | 0.92 t $NH_4Cl$ brine |
| Evaporation to 33% $NH_4Cl$ | 0.08 t KCl |
| 1.29 t/t $Na_2SO_4$ | |
| | 0.05 t $K_2SO_4$    SOLIDS |
| | 1.73 t $H_2O$       0.28 t KCl |
| | 0.08 t $K_2SO_4$ |
| | 2.78 Total    0.36 t Recycle |
| Lime Process @ 85% off | |
| 0.57 t CaO | 0.29 t $NH_3$ |
| | Brine:    0.955 $CaCl_2$ |
| | 0.08 t KCl |
| | 0.05 t $K_2SO_4$ |
| | 1.73 t $H_2O$ |
| | 2.815 t @ 75 to 90° C. |

Figure 2:
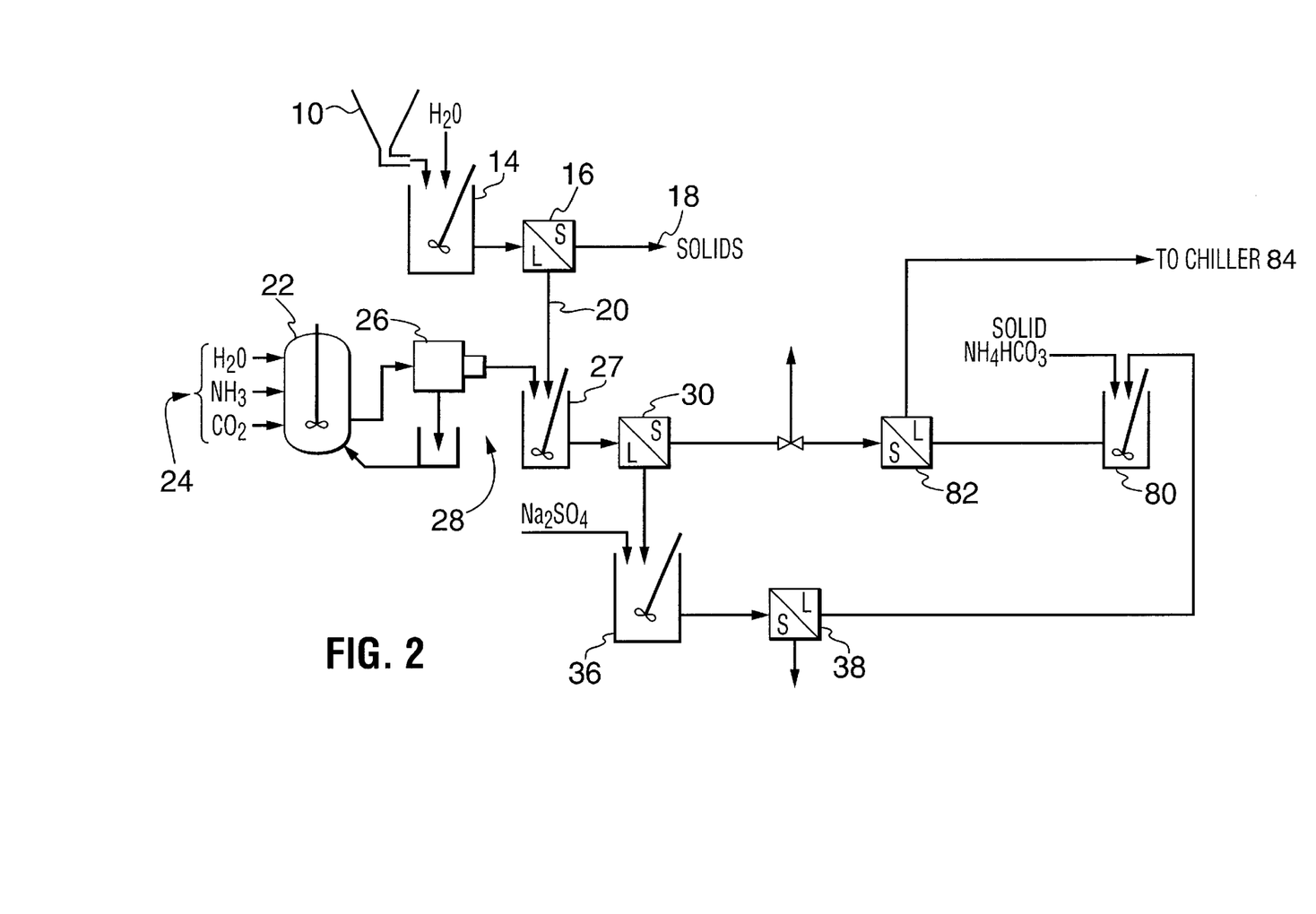
FIG. 2 is a is a process flow diagram illustrating a first part of a variation of the process according to the present invention.
Figure 2A:
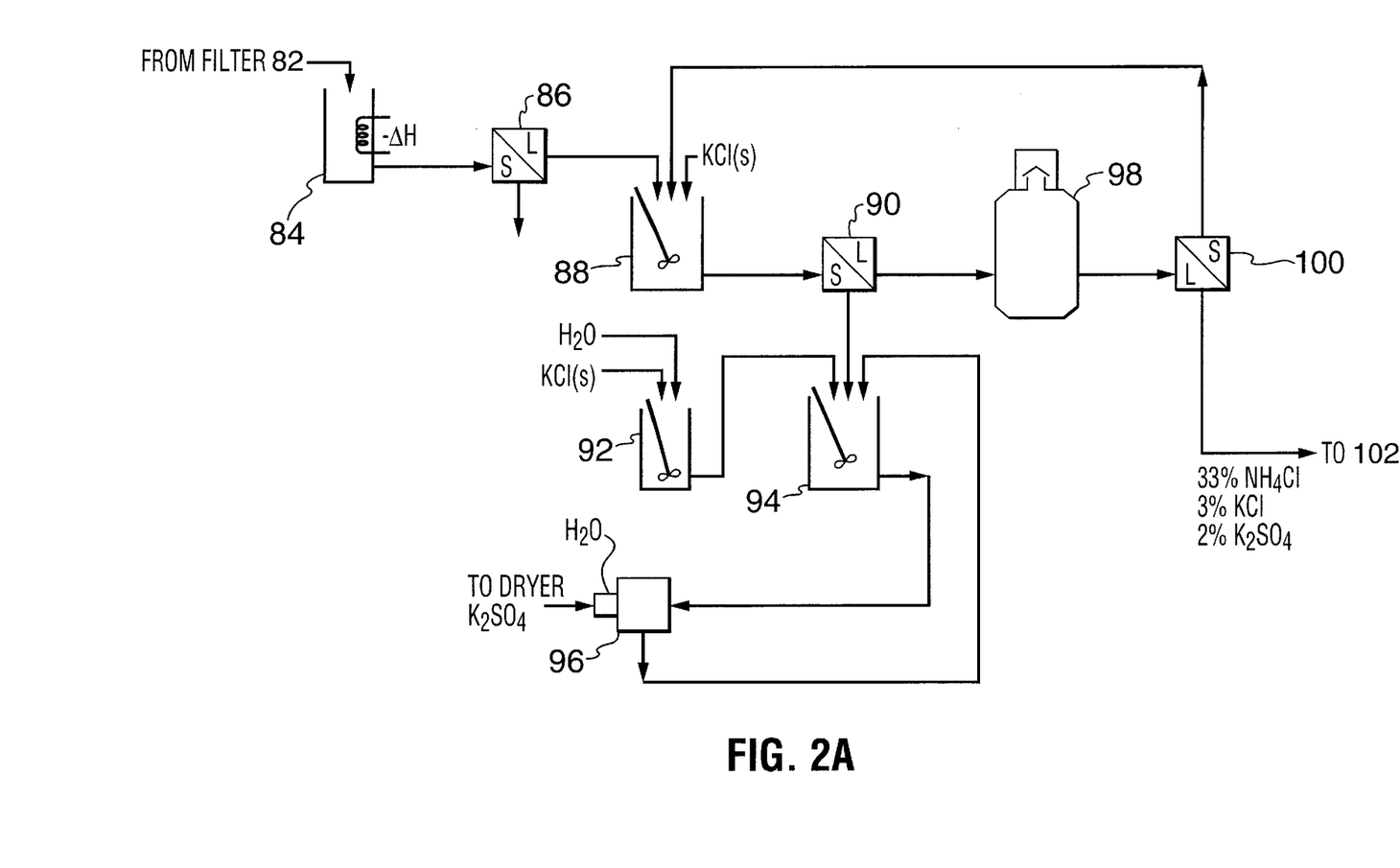
FIG. 2a illustrates a second part of the process illustrated in FIG. 2.
Figure 2B:
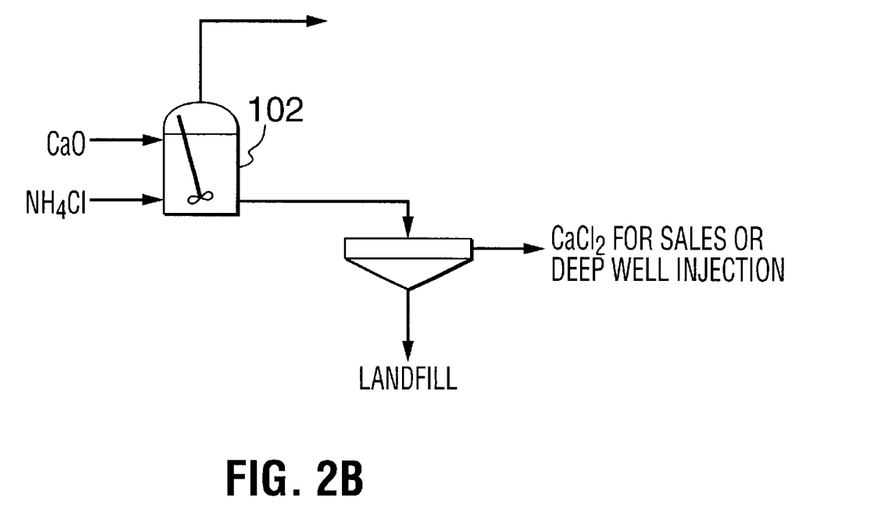
FIG. 2b illustrates a third part of the process illustrated in FIG. 2.

Turning to FIGS. 2 through 2b, an alternative processing scheme is schematically depicted. In this reaction scheme, prior to the production of sodium bicarbonate, the liquors are saturated with anhydrite.

In this embodiment, sodium bicarbonate is produced in crystallization unit 22 and undergoes generally similar steps as set forth for FIGS. 1 through 1B. The brine or filtrate is saturated with anhydrous sodium sulfate in vessel 36 and filtered with filter 38 to remove insolubles which are discarded. The filtrate from this operation is reacted with ammonium bicarbonate in vessel 80. As an alternative, the filtrate could be reacted with ammonia or carbon dioxide to precipitate the sodium bicarbonate. The solution is filtered with filter 82 and the sodium bicarbonate remains. The latter is combined with the sodium bicarbonate from filter 30 and then washed, centrifuged and dried. These steps are not shown.

The filtrate remaining has a composition of approximately, on a by weight basis, 10% sodium sulfate, 24% ammonium sulfate and 8% sodium bicarbonate. The solution has a specific gravity of 1.285 at 40° C.

From this stage, the filtrate solution is cooled in a chiller 84 to approximately 0° C. in order to produce a filtrate containing approximately, on a by weight basis 5% sodium sulfate, 28% ammonium sulfate and 6% sodium bicarbonate. The solution is filtered with filter 86 and precipitated sodium bicarbonate and sodium sulfate are recycled back to the bicarbonate crystallization vessel 32, while the filtrate is reacted with potassium chloride in vessel 88 to synthesize first stage potassium sulfate in a purity range of about 75% to 90%. The solid potassium sulfate is repulped with potassium chloride brine from vessel 92 in vessel 94. This results in high quality, high grade potassium sulfate. The product is washed with water in a conventional washing stage 96 with recycle to vessel 94.

The solution from filter 90 is evaporated in evaporator 98 (FIG. 2A) to concentrate ammonium chloride liquor whereby upon cooling the potassium chloride and sulfates are minimized. The solution is filtered using filter 100 with the precipitated potassium chloride and $(x)SO_4$, where x=K, Na, recycled to vessel 88.

The filtrate from filter 100 containing ammonium chloride, potassium chloride and potassium sulfate is passed into evaporator 102. The sodium bicarbonate backs the reaction and as a result, ammonia and carbon dioxide are released. These gases are then scrubbed/handled using suitable techniques. The calcium chloride generated is then discarded or sold.

EXAMPLE 2

NO BICARBONATE KILL

Feed—1 liter @ 1.3 S.G. 360 g/l $Na_2SO_4$
1 st STAGE
Production of $NaHCO_3$
Brine Exit at reaction termination:

| | | |
|---|---|---|
| 130 g $Na_2SO_4$ | 10.4% $Na_2SO_4$ | 40° C. |
| 213.8 g $(NH_4)_2SO_4$ | 17.1% $(NH_4)_2SO_4$ | 1.250 S.G. @ 0.95 l |
| 100 g $NaHCO_3$ | 8.0% $NaHCO_3$ | solution |
| 907 g $H_2O$ | | |
| 1350.8 | | |
| This makes 172 g $NaHCO_3$ solids | | |
| consumes 55 g $NH_3$ | | |
| 142.5 g $CO_2$ | | |

Resaturation with $Na_2SO_4$: brine will hold 150 g $Na_2SO_4$. This brine is then filtered and fed to the second stage $NaHCO_3$ crystallizer.

| FEED | REACTION | EXIT BRINE | PRODUCT |
|---|---|---|---|
| 280 g $Na_2SO_4$ | 35.9 g $NH_3$ | 130 g $Na_2SO_4$ | 177 g $NaHCO_3$ |
| 213.8 g $(NH_4)_2SO_4$ | 92.9 g $CO_2$ | 353 g $(NH_4)_2SO_4$ | |
| 100 g $NaHCO_3$ | | 100 g $NaHCO_3$ | |
| 907 g $H_2O$ | | 907 g $H_2O$ | |
| 1490.8 g | | 1490 g | |
| 1.151 @ 1.32 S.G. | | 1.285 S.G. | |
| | | 1.151 | |
| | | 23.7% $(NH_4)_2SO_4$ | |

The exit brine is then cooled to 0° C.

Brine composition is: 5.0% $Na_2SO_4$ which mean 60 g $Na_2SO_4$ precipitates as 136 g of $Na_2SO_4 10H_2O$ precipitate and remove 76 g of $H_2O$.

Therefore: 907−76=831 g $H_2O$

Brine composition @ 0° C. and 1.26 S.G.

70 g $Na_2SO_4$
353 g $(NH_4)_2SO_4$
100 g $NaHCO_3$
831g $H_2O$
1354g TOTAL
About 1 liter brine $K_2SO_4$ a) $\dfrac{70 \text{ g } Na_2SO_4}{142} \times 174 = 85.8$ b) $\dfrac{353 \text{ g } (NH_4)_2SO_4}{132} \times 174 = 465.3 \text{ g}$

EXIT BRINE:

| | | |
|---|---|---|
| 283 g $NH_4Cl$ | | 21.9% |
| 57 g NaCl | | 4.8% |
| 119 g $(KNaHCO_3)$ | | 9.2% |
| 831 g $H_2O$ | | |
| 1290 | | |

Boil up to 33.0% $NH_4Cl$.

Release of $NH_3$ and $CO_2$ from evaporator but $NH_4Cl$ salts out KCl and not the NaCl. KCl is recovered same as in Example 1.

BASIS: One Tonne $Na_2SO_4$ Feed

| | INPUTS | PRODUCT |
|---|---|---|
| First Stage | 0.15 t $NH_3$ | 0.48 t $NaHCO_3$ |
| | 0.396 t $CO_2$ | |
| | 2.52 t $H_2O$ | |
| Second Stage | 0.10 t $NH_3$ | 0.49 t $NaHCO_3$ |
| | 0.26 t $CO_3$ | |
| | 0.42 t $Na_2SO_4$ | |
| Cooled to 0° C. | | 0.4 t of $Na_2SO_4 10H_2O$ |

-continued

| INPUTS | | PRODUCT | |
|---|---|---|---|
| Cooler Brine | | 0.19 t $Na_2SO_4$ | 5% |
| | | 0.98 t $(NH_4)_2SO_4$ | 26% |
| | | 0.28 t $NaHCO_3$ | 7.4% |
| | | 2.31 t $H_2O$ | 61.4% |
| | | 3.76 t Total | |
| KCl | 1.62 t | 1.8 t $K_2SO_4$ | |
| Evaporation to 33% | $NH_4Cl$ | Brine | Solids |
| Circuit Control = | 0.7 t $H_2O$ | 0.98 t $NH_4Cl$ | 0.28 t KCl |
| Washing = | 0.5 t | 0.08 t KCl | 0.08 t $K_2SO_4$ |
| To evaporator | 1.2 t $H_2O$/t $Na_2SO_4$ | 0.15 t NaCl | 0.36 t |
| | | 0.19 t NaCl from $CO_3$ | |
| | | 1.57 t $H_2O$ | |
| | | 2.97 t | |
| Lime Process @ 85% efficiency | | 1.01 t $CaCl_2$ | |
| 0.61 t CaO | | 0.08 t KCl | |
| | | 0.34 t NaCl | |
| | | 1.57 t $H_2O$ | |
| | | 3.0 t @ 75–90° C. | |

EXAMPLE 3

BICARBONATE KILL—NO EVAPORATION OF AMMONIUM CHLORIDE

Feed Solution: from #1

412 g $(NH_4)_2SO_4$
335 g $Na_2SO_4$
1267 g $H_2O$ 2014 g @ 1.265 = 1.60 λ
Cooling to 0° C. yields a filtered solution of:

| | | |
|---|---|---|
| 412 g $(NH_4)_2SO_4$ | 28.7% | |
| 116 g $Na_2SO_4$ | 8.0% | |
| 907 g $H_2O$ | | |

1435 g solution

This brine is then heated to 25° C. where KCl solid is added to produce $K_2SO_4$. The exit brine from the $K_2SO_4$ circuit has the following composition:

| | | | |
|---|---|---|---|
| $NH_4Cl$ | 330.8 g | 21.9% | |
| KCl | 130 g | 8.6% | |
| NaCl | 94.7 | 6.3% | |
| x-$SO_4$ | 50 g | 3.3% | x = Na/K |
| $H_2O$ | 907 g | 60 | |
| | 1512 g | | |

This brine is than heated and reacted with lime to recover the ammonia and bypass the evaporator. The KCl reports to the $CaCl_2$ brine rather than being recovered in the evaporator. This represents a 15 to 20% loss of K to the $CaCl_2$ brine. The KCl in the $CaCl_2$ brine can be reduced to as low as 1.0% by adding solid $Na_2SO_4$ to $CaCl_2$/KCl brine. The potassium is effectively collected as appreciptated of syngenite ($CaSO_4.K_2SO_4.xH_2O$) at 0 to 100° C. with preferred temperatures of 20 to 30° C. so that $SO_4$ solubility is kept to minimum and the reaction occurs at a reasonable rate.

$CaCl_2$ Brine composition

| $CaCl_2$ Brine Compostion | | |
|---|---|---|
| 343.3 g CaCl2 | 22.5% | |
| 130 g KCl | 8.5% | |
| 94.7 g NaCl | 6.3% | |
| 50 g x $SO_4$ | 32.% | (Na/K) |
| 907 g $H_2O$ | 59.5% | |
| 1525 g | 100% | |

140 g $Na_2SO_4$ addition:

| Exit Brine | | Exit Cake |
|---|---|---|
| 234.8 g $CaCl_2$ | 17.8% | |
| 15.25 g KCl | 1.1% | 310 g $CaSO_4.K_2SO_4$ |
| 209 g NaCl | 15.9% | + 100 $g_{H2O}$ |
| 50 g x $SO_4$ | 3.8% | |
| 807 | 61.3% | |

The exit brine can be deep well disposed of and cake can be blended into the $K_2SO_4$ product as binder or further processed to remove the $CaSO_4$.

The cake can be reacted with $(NH_4)_2HCO_3$ from the $NaHCO_3$ process feed and the $CaSO_4$ reacts quickly to produce a brine of $(NH_4)_2SO_4$ and $K_2SO_4$ and a filter $CaCl_3$ precipitate which is disposed of. The $(NHa)_2SO_4/K_2SO_4$ brine is recycled to $K_2SO_4$ first stage crystallizer.

Although embodiments of the invention have been described above, it is not limited thereto and it will be apparent to those skilled in the art that numerous modifications form part of the present invention insofar as they do not depart from the spirit, nature and scope of the claimed and described invention.

I claim:

1. A method of formulating food grade sodium bicarbonate and potassium sulfate, comprising the steps of:
   a) providing a source of liquid sodium sulfate;
   b) providing a source of ammonium bicarbonate to precipitate sodium bicarbonate;
   c) contacting said sodium sulfate and said ammonium bicarbonate;
   d) precipitating sodium bicarbonate and forming a liquor;
   e) filtering said sodium bicarbonate;

f) saturating liquor from step e) with sodium sulfate;

g) contacting said liquor with ammonium bicarbonate, ammonia gas or carbon dioxide to precipitate further sodium bicarbonate;

h) filtering precipitated sodium bicarbonate from step g);

i) combining sodium bicarbonate precipitate from step e) and h) and washing to form food grade sodium bicarbonate;

j) treating liquor from step i) with sulfuric acid to convert carbonate minerals to sulfate minerals and release carbon dioxide gas;

k) cooling liquor from step j) to 0° C. to at least form Glauber's salt precipitate;

l) heating liquor from step k) to between 30° C. and 40° C.; and m) precipitating potassium sulfate by contacting said liquor from step l) with potassium chloride.

2. The method as set forth in claim 1, further including the step of separating precipitated potassium sulfate and washing with potassium chloride.

3. The method as set forth in claim 2, further including the step of treating liquor from said step of separating precipitated potassium sulfate with lime to liberate ammonia gas.

4. The method as set forth in claim 3, further including the step of recycling said ammonia gas to step g).

5. The method as set forth in claim 4, further including the step of evaporating filtrate from claim 4.

6. The method as set forth in claim 1, wherein said sodium sulfate has a specific gravity of between 1.30 and 1.34 at 40° C.

7. The method as set forth in claim 1, wherein said liquor from step d) has a specific gravity of 1.25 and contains, by weight, 10.4% sodium sulfate, 17.1% ammonium sulfate, between 8% to 12% sodium bicarbonate and an excess of ammonium bicarbonate.

8. The method as set forth in claim 1, wherein said sodium sulfate from step f) comprises $Na_2SO_4 \cdot 10\,H_2O$.

9. The method as set forth in claim 1, wherein said liquor from step f) has a specific gravity of 1.285 at 40° C.

10. The method as set forth in claim 1, wherein said liquor from step j) is a saturated liquor of sodium sulfate, ammonium sulfate and sodium bicarbonate.

11. The method as set forth in claim 1, wherein said potassium sulfate is generated in a yield of at least 80% with a purity of at least 98%.

12. The method as set forth in claim 1, wherein said potassium sulfate is generated in a yield of at least 80% with a purity of at least 98%.

13. A method of formulating food grade sodium bicarbonate and potassium sulfate, comprising the steps of:

a) providing a source of liquid sodium sulfate;

b) providing a source of ammonium bicarbonate;

c) contacting said sodium sulfate and said ammonium bicarbonate;

d) precipitating sodium bicarbonate and forming a liquor;

e) contacting said liquor from step d) with sodium sulfate;

f) saturating liquor from step d) with sodium sulfate;

g) filtering solids from said liquor of step e);

h) contacting said liquor from step f) with sulfuric acid to precipitate carbonates;

i) cooling liquor from step h) to 0° C. to form Glauber's salt precipitate;

j) heating liquor from step i) to between 30° C. and 40° C.;

k) treating said liquor from step j) with potassium chloride to precipitate potassium sulfate;

l) evaporating liquor from step k) to recover potassium values for recycling to step k); and m) drying said potassium sulfate.

14. The method as set forth in claim 13, further including the step of treating liquor remaining from step l) with lime and ammonium chloride.

15. The method as set forth in claim 14, wherein ammonia gas is liberated and recycled.

16. The method as set forth in claim 13, wherein used potassium chloride solution is recycled to step k).

* * * * *